United States Patent [19]

Hsieh

[11] Patent Number: 5,668,780
[45] Date of Patent: Sep. 16, 1997

[54] BABY CRY RECOGNIZER

[75] Inventor: Chau-Kai Hsieh, Chiung Lin, Taiwan

[73] Assignee: Industrial Technology Research Institute, Hsinchu, Taiwan

[21] Appl. No.: 968,747

[22] Filed: Oct. 30, 1992

[51] Int. Cl.$^6$ ........................................... G10L 5/00
[52] U.S. Cl. ............................. 367/198; 381/56
[58] Field of Search ................. 367/198; 381/43, 381/56, 42

[56] References Cited

U.S. PATENT DOCUMENTS

| | | | |
|---|---|---|---|
| 4,542,525 | 9/1985 | Hopf | 381/56 |
| 4,763,278 | 8/1988 | Rajasekaran et al. | |
| 4,780,906 | 10/1988 | Rajasekaran et al. | |
| 4,799,171 | 1/1989 | Cummings | |
| 5,003,603 | 3/1991 | Searcy et al. | 381/43 |

FOREIGN PATENT DOCUMENTS

| | | |
|---|---|---|
| 28117 | of 0000 | China |
| 40308 | of 0000 | China |

*Primary Examiner*—Michael Horabik
*Attorney, Agent, or Firm*—Meltzer, Lippe, Goldstein, Wolf & Schlissel, P.C.

[57] ABSTRACT

A baby cry recognizer is disclosed which includes an amplifier circuit for amplifying a received sound signal. In response to the amplified sound signal, a pulse generator circuit generates a pulse signal having zero crossings which are aligned with zero crossings of the amplified sound signal. The pulse signal, in turn, is inputted to a signal recognition circuit. The signal recognition circuit is capable of obtaining the zero crossing rate of the pulse signal during each of a preselected number of frames in a predetermined length time interval. The signal recognition circuit then determines if the zero crossing rate of the pulse signal, in more than a first threshold number of this preselected number of frames, is within a particular frequency range. The signal recognition circuit also determines if the zero crossing rate of the pulse signal over the entire time interval is greater than or equal to a second low threshold but less than or equal to a third high threshold. If these two conditions are satisfied, then the signal recognition circuit outputs a signal indicating that a baby's cry was detected.

22 Claims, 2 Drawing Sheets

BABY CRY RECOGNIZER

FIELD OF THE INVENTION

The present invention relates to voice recognition. More particularly, the present invention relates to recognizing particular sounds such as the crying sound of a baby.

BACKGROUND OF THE INVENTION

Voice recognition relates to detecting and discriminating voice and speech sounds. Voice recognition may be used in devices which are triggered by voice or speech sounds such as a baby cry recognizer. Several methods have been proposed for voice recognition including a filter bank method and a method which uses linear prediction codes. Both of these methods have a good recognition rate but are complicated and require expensive hardware.

Another, less complicated, technique utilizes the zero crossing rate (ZCR) feature of the inputted sound signal. FIG. 1 shows a graph of an exemplary inputted sound signal. As depicted, the signal traces an undulating path above and below a zero polarity axis which axis is located at the center between the maximum and minimum signal levels of the inputted sound signal. The ZCR is simply the rate in which the path traced by the sound signal crosses the zero polarity axis (i.e., the number of zero crossings in a frame or time interval divided by the duration of that frame or time interval). Generally, ZCR techniques have a substantially lower recognition rate than the two aforementioned techniques.

Several ZCR devices have been proposed for voice recognition. R.O.C. Patent Nos. 28117 and 40308, propose systems in which sound signals both with and without voice sounds are analyzed. Thereafter, a comparison, such as a distance measurement, is performed on sound signals containing voice sounds. Such systems are complex as both voiceless and voiced sound signals must be analyzed.

U.S. Pat. Nos. 4,763,278 and 4,780,906, disclose speech recognizers which convert the ZCR of an inputted sound signal into a feature vector containing information about the ZCR and energy of the inputted sound signal. The feature vector is compared to predetermined template vectors. The recognized word may then be selected as the word having a template vector which best matches the feature vector of the inputted sound signal. A device according to these patents, however, is complex as it requires the computation of a feature vector.

U.S. Pat. No. 4,799,171, discloses a device which uses the ZCR of an inputted sound signal to determine whether the frequency of the sound signal is in a low frequency band (indicating that the sound signal contains the word "yes") or a high frequency band (indicating that the sound signal contains the word "no"). Such a device does not provide an acceptable recognition rate and is thus used only for toys.

It is an object of the present invention to overcome the disadvantages of the prior art devices.

SUMMARY OF THE INVENTION

This and other objects are achieved by the present invention which provides a device and process for recognizing a particular sound, such as a baby's cry, in an inputted sound signal if two conditions are met:

1. more than a first threshold $C_1$ of frames of a preselected number of frames C in a predetermined length time interval satisfy $f_1 \leq ZCR_f \leq f_2$ where $ZCR_f$ is the zero crossing rate of the sound signal during a frame and $f_1$ and $f_2$ are lower and upper frequencies of a particular frequency range, and 2. the zero crossing rate during the entire time interval satisfies $C_2 \leq ZCR_T \leq C_3$ where $C_2$ is a low frequency threshold, $C_3$ is a high frequency threshold and $ZCR_T$ is the zero crossing rate during the entire time interval.

A baby cry recognizer according to one embodiment of the present invention includes an amplifier circuit which amplifies a received sound signal. In response to the amplified sound signal, a pulse generator circuit generates a pulse signal with zero crossings which are aligned with the zero crossings of the amplified sound signal. The pulse signal, in turn, is inputted to a signal recognition circuit. The signal recognition circuit, obtains the zero crossing rate of the pulse signal during each of a preselected number of frames in a predetermined length time interval. The signal recognition circuit then determines if the zero crossing rate of the pulse signal is within a particular frequency range during more than a first threshold number of frames of the preselected number of frames. The signal recognition circuit also determines if the zero crossing rate of the pulse signal, over the entire time interval, is greater than or equal to a second low threshold but less than or equal to a third high threshold. If these two conditions are satisfied, then the signal recognition circuit outputs a signal indicating that a baby's cry was detected.

Illustratively, prior to determining whether the two above mentioned conditions are satisfied, the signal recognizer first evaluates a precondition to determine if a baby's cry was potentially received. In evaluating the precondition, the signal recognizer determines the zero crossing rate in each frame of a predetermined length time interval. Then, the signal processor determines if the zero crossing rate of the pulse signal during each frame of the time interval is at least equal to a fourth threshold. If so, the signal recognizer evaluates the aforementioned conditions for determining if a baby's cry was detected. Otherwise, the signal recognizer evaluates the same precondition for the next succeeding time interval.

In short, a baby cry recognizer is provided which is simple and inexpensive yet has a reasonably good accuracy. Since the baby cry recognizer uses ranges and thresholds which may be predetermined, it need not be trained to the voice of the particular subject to be monitored.

DETAILED DESCRIPTION OF THE INVENTION

Figure 1:
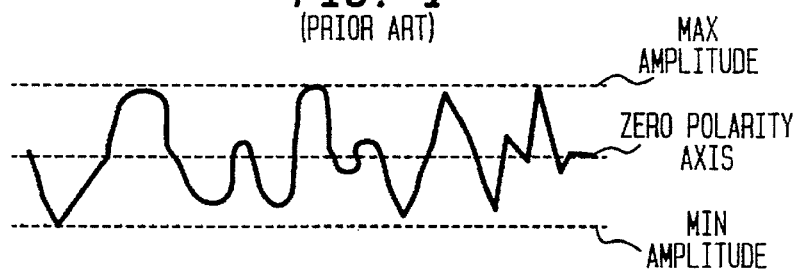
FIG. 1 graphically depicts an exemplary sound signal waveform and its zero crossings.
Figure 2:
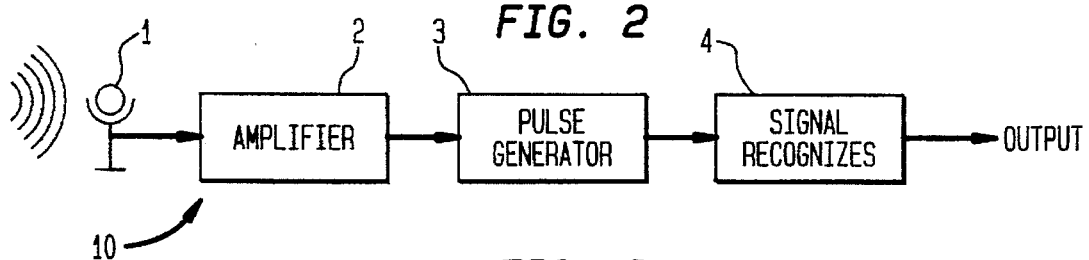
FIG. 2 depicts a block diagram of a baby cry recognizer according to an embodiment of the present invention.
Figure 3:
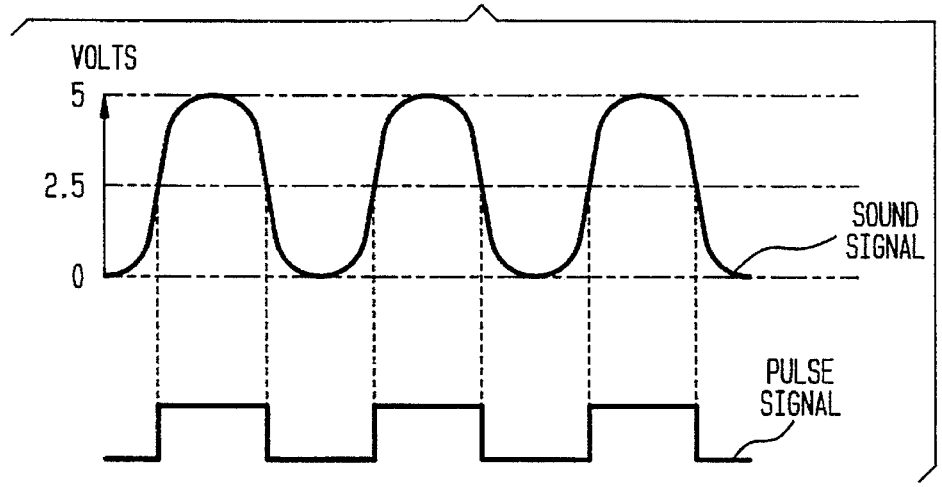
FIG. 3 depicts an exemplary amplified signal waveform and a corresponding pulse signal waveform produced by the circuit of FIG. 2.

Referring now to FIG. 2, a baby cry recognizer 10 according to the present invention is depicted in block form. The baby cry recognizer 10 includes a microphone 1 which detects sounds, including, for example, a baby's cry. This sound signal is converted to electrical form therein and inputted to an amplifier 2. Illustratively, the amplifier 2 amplifies the signal to produce a 0 to 5 volt peak to peak amplitude signal as depicted in FIG. 3. Such a signal has as 2.5 volt zero polarity axis.

Referring again to FIG. 2, the amplified signal outputted from the amplifier 2 is inputted to a pulse generator 3. As depicted in FIG. 3, the pulse generator 3 generates a pulse signal having zero crossings which are aligned with the zero crossings of the amplified signal. For example, a series of rectangular pulses may be generated wherein each zero crossing of the inputted signal is approximately aligned with a corresponding rising or falling edge of a rectangular pulse of the pulse signal. Illustratively, it is advantageous to convert the amplified sound signal to a pulse signal so as to remove other extraneous features of the signal (e.g., the signal's amplitude, shape, etc.) which are not of interest in detecting a baby's cry according to the present invention.

The pulse signal generated by the pulse generator 3 is inputted to a signal recognizer 4. Therein, the pulse signal is analyzed to determine if a baby's crying sound was received. A process for recognizing a baby's cry is discussed in detail below. The signal recognizer 4 recognizes a baby's cry if two conditions are satisfied. First, the signal recognizer 4 determines if more than a first threshold number of frames $C_1$, of a preselected number of frames C within a time interval, satisfy $f_1 \leq ZCR_f \leq f_2$, where $f_1$ and $f_2$ are low and high frequencies of a particular frequency range and $ZCR_f$ is the ZCR during a frame. In the above determination, the number of zero crossings in each frame may be substituted for each $ZCR_f$ in the expression $f_1 \leq ZCR_f \leq f_2$ provided $f_1$ and $f_2$ are replaced by their corresponding equivalent number of zero crossings in a frame (i.e., $f_1$ and $f_2$ are each multiplied by the duration of a frame). Second, the signal recognizer 4 determines if $C_2 \leq ZCR_T \leq C_3$ is satisfied where $ZCR_T$ is the ZCR over an entire time interval, $C_2$ is a second low threshold and $C_3$ is a third high threshold. Again, the number of zero crossings in a time interval may be substituted for $ZCR_T$ in the expression $C_2 \leq ZCR_T \leq C_3$ provided $C_2$ and $C_3$ are replaced by their corresponding equivalent number of zero crossings in a time interval (i.e., $C_2$ and $C_3$ are each multiplied by the duration of a time interval).

If a baby's cry is detected (i.e., these two conditions are satisfied), the signal recognizer 4 outputs an indication signal. This indication signal may be an alarm which alerts an attendant. Alternatively, the indication signal triggers a pacifying device such as a motor which rocks the cradle in which the baby is resting.

It is not necessary to train the device 10, i.e., it is not necessary to execute a preprocess in which the monitored baby's voice is inputted to the device 10 to set parameters therein for recognizing the baby's voice. Rather, predetermined thresholds and frequency ranges are illustratively used in the signal recognizer 4 according to a process (discussed in detail below) which accurately recognizes the cry of a broad segment of the population of babies.

Figure 4:
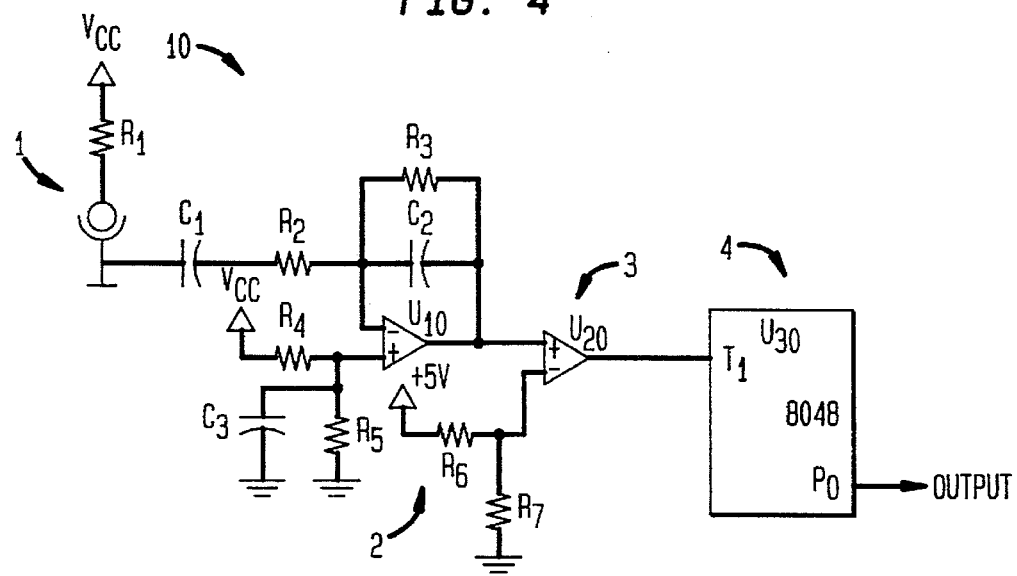
FIG. 4 depicts a more detailed circuit according to an embodiment of the present invention.

Turning now to FIG. 4, a more detailed circuit diagram for the baby cry detector 10 is shown. Inputted sound signals are converted by the microphone 1 into electrical signals. Illustratively, the microphone 1 is powered by a voltage source $V_{cc}$ via a resistor $R_1$. The electrical signal generated by the microphone 1 is coupled through a coupling capacitor $C_1$ to the inverting input of an op amp $U_{10}$. (The capacitor $C_1$ blocks dc signals). As depicted, the op amp $U_{10}$, resistors $R_2$ and $R_3$ and capacitors $C_1$ and $C_2$ are connected to form a bandpass amplifier, with roll off points at $(R_2C_1)^{-1}$ and $(R_3C_2)^{-1}$. Illustratively, $R_2$, $R_3$, $C_1$ and $C_2$ are selected to filter out sounds outside of the frequency range of human voices. Furthermore, $R_2$ and $R_3$ are illustratively selected so as to adequately amplify the signal outputted by the microphone 1 to a 5 volt peak to peak amplitude.

It may also be desirable to ensure that the voltage level of the amplified sound signal is strictly in the range of 0 to the maximum positive peak output of the op amp $U_{10}$ (e.g., 5 volts). To that end, a dc voltage may be inputted to the non-inverting input of the op amp $U_{10}$ so that the output signal has a component equal to the maximum positive peak output of the op amp $U_{10}$ (e.g., 5 volts). This may be achieved by connecting a voltage divider network $R_4$ and $R_5$ to $V_{cc}$ as shown (the capacitor $C_3$ may also be added to remove any ac component of the non-inverting input signal). The two output signal components (the amplified inverted sound signal, and the amplified dc signal) are added together to produce an amplified sound signal with the appropriate peak to peak amplitude (e.g., 0 to 5 volts).

The signal outputted from the op amp $U_{10}$ is fed to the pulse generator 3. Illustratively, a second op amp $U_{20}$ is used in order to generate the pulse signal. To generate a rectangular pulse signal with zero crossings which are aligned with the zero crossings of the amplified signal, the op amp $U_{20}$ is connected as a comparator. The amplified sound signal is inputted to the non-inverting input of the op $U_{20}$. A constant dc input voltage equal to the zero polarity axis level (e.g., 2.5 volts) is illustratively supplied to the inverting input of the op amp $U_{20}$. This may be achieved by inputting the maximum peak amplitude of the amplified signal (e.g., 5 volts) through a voltage divider network $R_6$–$R_7$, where $R_6$=$R_7$. It may be appreciated that both inputs are overdriven thereby producing a clipped or rectangular shaped output waveform. Wherever the amplitude of the amplified signal is less than the zero polarity axis, i.e., less than 2.5 volts, the dc signal of the inverting input dominates the input, thereby producing an output signal with a constant minimum level. Wherever, the amplified signal exceeds the zero polarity axis, however, the amplified sound signal of the non-inverting input dominates the input thereby producing an output signal with a constant maximum level.

The pulse signal thus generated is inputted to a signal recognizer circuit 4, such as the microcomputer $U_{30}$. Illustratively, the pulse signal is inputted to the lead T1 of an Intel 8048 single chip microprocessor. An indication signal is outputted from lead P0 if a baby's cry is recognized.

Figure 5:
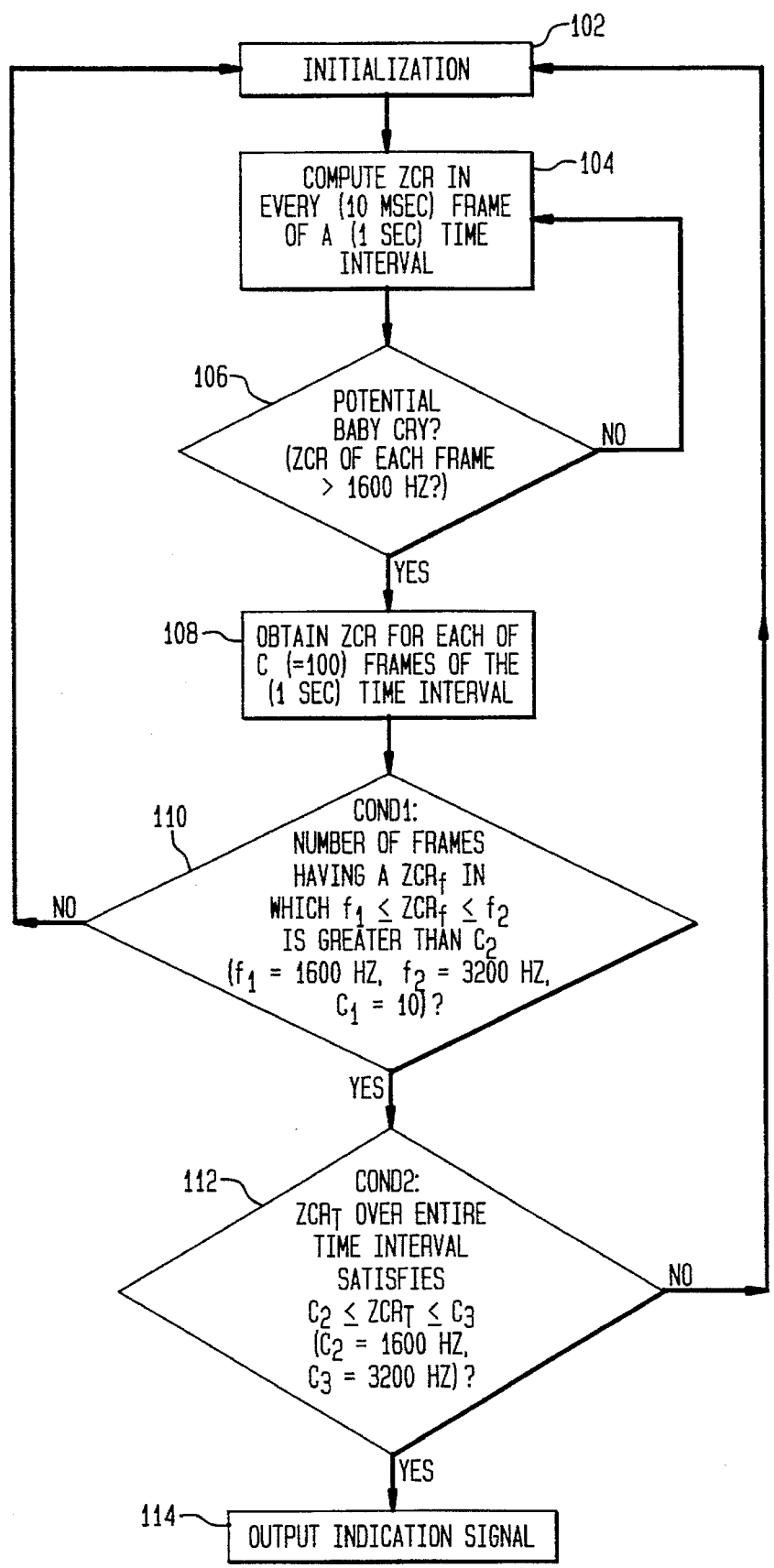
FIG. 5 schematically depicts a flow chart illustrating the process executed by the signal recognizer of FIGS. 2 and 4.

Turning now to FIG. 5, the determination process performed by the signal recognizer circuit 4 (e.g., the microcomputer $U_{30}$) is now discussed. In a first step 102, the signal recognizer performs various initialization procedures such as resetting any parameters and or circuitry (e.g., counters) which may be utilized therein. Next in step 104, the signal recognizer circuit determines the ZCR for every frame (referred to as $ZCR_f$) in a predetermined time interval. Illustratively, the predetermined time interval is 1 second and the duration of each frame is 10 milliseconds. In step 106, the signal recognizer circuit determines if, from the $ZCR_f$ measured in each frame of the predetermined time interval, a crying sound may have been transmitted. For example, the signal recognizer may determine if the $ZCR_f$ in each frame is greater than or equal to a threshold frequency, e.g., 1600 Hz. If this is not the case, the process loops back to step 104 wherein the $ZCR_f$ is again measured in each frame (10 msec) of the next, successive time interval (1 sec). If, on the other hand, the $ZCR_f$ in each frame does exceed the threshold (e.g., 1600 Hz), the signal recognizer proceeds to step 108.

Alternatively, the signal recognizer may determine the number of zero crossings in each frame (10 msec) of the time interval (1 sec) in step 104. In such a case, the signal recognizer determines if the number of zero crossings in each frame is greater than or equal to a threshold number of zero crossings, e.g., 16, in step 106.

In step 108, the $ZCR_f$ is obtained for a preselected number of frames C within the predetermined time interval. Illustratively, C equals 100 frames. (Thus, the $ZCR_f$ is obtained for each frame in an entire time interval of 1 sec.) Next in step 110, the signal recognizer determines if the number of these C frames in which the $ZCR_f$ falls in the range $f_1 \leq ZCR_f \leq f_2$ is greater than the threshold $C_1$. Illustratively, $f_1$ equals 1600 Hz, $f_2$ equals 3200 Hz and $C_1$ equals 10 frames. Alternatively, the number of zero crossings is obtained in C frames in step 108. In such a case, then, in the above example, $f_1$ illustratively equals 16 crossings and $f_2$ equals 32 crossings. If the aforementioned condition of step 110 is not satisfied, the signal recognizer returns to step 102. If this condition is satisfied, the signal recognizer performs step 112.

In step 112, the signal recognizer determines whether the ZCR over the entire time interval (referred to as $ZCR_T$) is between a low threshold $C_2$ and high threshold $C_3$, i.e., $C_2 \leq ZCR_T \leq C_3$. Illustratively, $C_2$ equals 1600 Hz and $C_3$ equals 3200 Hz. Because $ZCR_T$ is the ZCR over the entire time interval of 1 sec the thresholds of $C_2$=1600 zero crossings and $C_3$=3200 zero crossings may be used. If this condition is not satisfied, the signal recognizer returns to step 102. However, if this condition is satisfied, the signal recognizer outputs a signal indicating that a baby's cry was received in step 114. Such a signal may be used to trigger an alarm to alert an attendant or may be used to trigger a pacifying device, e.g., a motor which rocks the cradle in which the baby is resting.

In summary, a baby cry detector is disclosed which is both simple and inexpensive. The invention analyzes the zero crossing rate of an inputted sound signal using simple threshold conditions. Despite the simplicity of the detector, a baby's cry may be recognized with reasonably good accuracy. Moreover, a detector according to the present invention need not be trained to recognize the voice of the particular monitored subject in order to recognize a baby's cry.

Finally, the aforementioned embodiments are intended to be merely illustrative. Numerous other embodiments may be devised by those having ordinary skill in the art without departing from the spirit and scope of the following claims.

We claim:

1. A baby cry recognizer comprising:
   an amplifier circuit capable of amplifying a received sound signal,
   a pulse generator circuit, connected to said amplifier circuit, generating a pulse signal having zero crossings which are aligned with zero crossings of said amplified signal, and
   a signal recognition circuit, receiving said pulse signal, capable of obtaining the zero crossing rate of said pulse signal during each of a preselected number of frames in a predetermined length time interval and determining whether the received sound signal is a baby cry when:
   the zero crossing rate of said pulse signal, in more than a first threshold number of said preselected number of frames, falls within a particular frequency range, and the zero crossing rate of said pulse signal over said entire time interval at least equals a second low threshold but at most equals a third high threshold; and for outputting an indication signal when the received sound signal is determined to be a baby cry.

2. The baby cry recognizer of claim 1 wherein prior to said signal recognition circuit determines that the received sound signal is a baby cry, said signal recognition circuit determines the zero crossing rate of said pulse signal in each successive frame of predetermined length time intervals until the zero crossing rate in each frame of the most recent time interval is greater than or equal to a fourth threshold.

3. The baby cry recognizer of claim 2 wherein said fourth threshold is 1600 Hz.

4. The baby cry recognizer of claim 1 further comprising a microphone capable of detecting sound and outputting to the amplifier circuit an electrical sound signal corresponding thereto.

5. The baby cry recognizer of claim 1 further comprising a filter circuit connected to the amplifier circuit for filtering out voiceless signals from said sound signal.

6. The baby cry recognizer of claim 5 wherein said filter circuit is a bandpass filter.

7. The baby cry recognizer of claim 1 wherein said sound signal is received at an inverting input of said amplifier circuit and a dc signal is received at a non-inverting input of said amplifier circuit.

8. The baby cry recognizer of claim 1 wherein said pulse generator circuit comprises a comparator amplifier receiving said amplified sound signal at one input and a dc signal equal to the zero polarity axis level of said amplified sound signal at a second input.

9. The baby cry recognizer of claim 1 wherein said predetermined time interval is 1 second and said frame is 10 milliseconds.

10. The baby cry recognizer of claim 1 wherein said first threshold is 10 frames.

11. The baby cry recognizer of claim 1 wherein said particular frequency range is 1600 Hz to 3200 Hz.

12. The baby cry recognizer of claim 1 wherein said second low threshold is 1600 Hz and said third high threshold is 3200 Hz.

13. A process for recognizing a baby's cry comprising the steps of:
   filtering out non-voice signals from a received sound signal,
   amplifying said filtered sound signal,
   generating a pulse signal having zero crossings which are aligned with the zero crossings of said detected sound signal,
   obtaining the zero crossing rate of said pulse signal during each of a preselected number of frames in a predetermined length time interval, determining if the zero crossing rate of said pulse signal in more than a first threshold number of said preselected number of frames falls within a particular frequency band, determining if the zero crossing rate of said pulse signal over said entire time interval is at least equal to a second threshold but at most equal to a third threshold, and outputting an indicating signal from said signal recognition circuit if the conditions of both of said determining steps are satisfied.

14. The process of claim 13 further comprising determining the zero crossing rate of each frame in a predetermined length time interval and if the zero crossing rate of any frame of said predetermined length time interval is less than a fourth threshold repeating said step of determining the zero crossing rate.

15. The process of claim 13 further comprising detecting a sound at a microphone and outputting an electrical sound signal corresponding thereto.

16. A process for recognizing a specific audio signal comprising the steps of:

detecting an audio signal, in at least some frames of a time interval divided into a plurality of frames, determining a first zero crossing rate ($ZCR_f$) of the detected audio signal and determining if the first zero crossing rate $ZCR_f$ is between a first frequency ($f_1$) and a second frequency ($f_2$) for a first threshold number ($C_1$) of said frames, and determining a second zero crossing rate ($ZCR_T$) of the audio signal for the entire time interval and if the second zero crossing rate ($ZCR_T$) is between a third ($C_2$) and a fourth frequency ($C_3$) whereby said specific audio signal is detected.

17. The method of claim 16 wherein said specific audio signal corresponds to a baby crying.

18. The method of claim 16, wherein the method further comprises the step of activating a device when said specific audio signal is detected.

19. A baby cry recognizer comprising:

an amplifier circuit capable of amplifying a received sound signal, a pulse generator circuit, connected to said amplifier circuit, generating a pulse signal having zero crossings which are aligned with zero crossings of said amplified signal, and a signal recognition circuit, receiving said pulse signal, capable of obtaining the number of zero crossings of said pulse signal during each of a preselected number of frames in a predetermined length time interval and determining whether the received sound is a baby cry if the number of zero crossings in more than a first threshold number of said preselected number of frames are in a range of zero crossings corresponding to a particular frequency range, and if the number of zero crossings of said pulse signal over said entire time interval at least equals a second low threshold but at most equals a third high threshold.

20. The baby cry recognizer of claim 19 wherein prior to determining whether the received sound is a baby cry, said signal recognition circuit determines the number of zero crossings of said pulse signal in each successive frame of predetermined length time intervals until the number of zero crossings in each frame of the most recent time interval is greater than or equal to a fourth threshold.

21. A process for recognizing a specific audio signal comprising the steps of:

generating a signal corresponding to a received audio signal, in at least some frames of a time interval divided into plurality of frames, determining the number of zero crossings of the generated signal and determining if the number of zero crossings is between a first number of zero crossings and a second number of zero crossings for a first threshold number ($C_1$) of said frames, determining the number of zero crossings of the generated signal for the entire time interval and if the number of zero crossings is between a third number of zero crossings and a fourth number of zero crossings whereby said specific audio signal is detected, and activating a device when said specific audio signal is detected.

22. A signal recognition device comprising:

(a) pulse generating means for receiving a sound signal and generating a pulse signal having zero crossings corresponding to zero crossings of the received sound signal; and (b) signal recognizing means connected to the pulse generating means for:
  (i) receiving the generated pulse signal;
  (ii) counting the zero crossings of the generated pulse signals during each of a plurality of preselected time intervals;
  (iii) determining if a first predetermined number of zero crossings occur in a second predetermined number of the plurality of preselected time intervals;
  (iv) determining if the number of zero crossings during all of the plurality of preselected time intervals is within a range between third and fourth predetermined numbers; and
  (v) generating recognition indication signal when the signal recognizing means determined that conditions (iii) and (iv) above are met.

* * * * *